United States Patent

Titt

[15] 3,695,120
[45] Oct. 3, 1972

[54] INFINITELY VARIABLE FRICTION MECHANISM

[72] Inventor: Georg Titt, Obere Vorstadt 9, D-8358, Vilshofen, Germany

[22] Filed: Jan. 14, 1971

[21] Appl. No.: 106,373

[52] U.S. Cl. ................................ 74/690, 74/190
[51] Int. Cl. ............................................. F16h 37/06
[58] Field of Search .................... 74/190, 190.5, 690

[56] References Cited

UNITED STATES PATENTS

| | | | |
|---|---|---|---|
| 2,178,859 | 11/1939 | Jett et al. | 74/690 |
| 2,209,023 | 7/1940 | Jett | 74/690 |
| 3,299,743 | 1/1967 | Stockton | 74/690 |

*Primary Examiner*—C. J. Husar
*Attorney*—Burns, Doane, Swecker & Mathis

[57] ABSTRACT

Infinitely variable friction mechanism having axially aligned driving and driven shafts with attached friction disks that are rotated in opposite directions by barrel-shaped rollers that are articulated in a basket and in a first ring that is longitudinally shiftable relative to the basket. A second ring that is also independently longitudinally shiftable cooperates with the first ring in conjunction with the torque prevailing on the basket for providing counter pressure regulation of the frictional matings. Coupled to the output of the friction mechanism is a planetary gearing arrangement having an inside sun wheel driven by the driving shaft and an outside wheel connected to the driven friction disk but supported by a wheel which may be allowed to turn freely or to be braked in one or both rotational directions.

25 Claims, 9 Drawing Figures

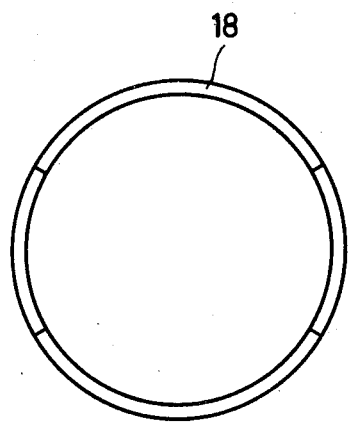
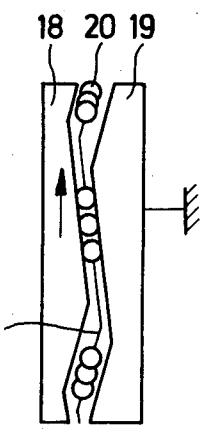
FIG. 3A  FIG. 3B  FIG. 3C
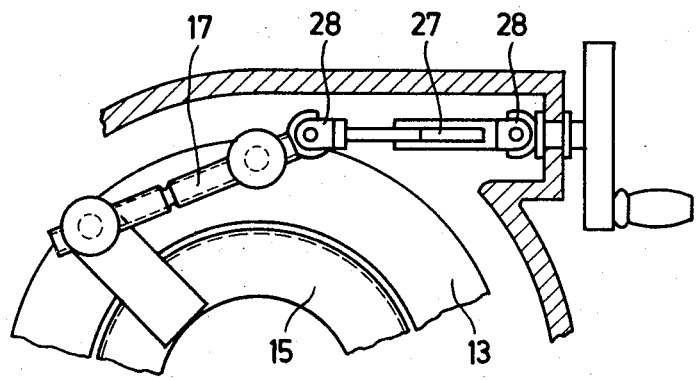
FIG. 4

INFINITELY VARIABLE FRICTION MECHANISM

The invention relates to an infinitely variable friction mechanism in which friction rollers are disposed between two friction disks.

In the case of known designs, the friction rollers having a large diameter with the same circular periphery will run, depending on the adjustment of the mechanism, on different radii of the circular disks. This method of operation exists not only in the case of mechanisms of this type but also in the case of all other constructions. In the interest of a long, useful life, every friction body, however, should change its course with every adjustment. In the case of the above-mentioned design, the friction rollers acting between the friction disks must be adjusted in their position by means of an expensive mechanism and depending on the desired transmission ratio.

Only a limited number of friction rollers may be placed on the periphery, so that corresponding to the load that is to be transmitted, large size transmissions are necessary which are expensive to produce and which, because of their large space requirements, cannot be used at all, for example, in automobile construction. Conditions are even worse in the case of friction mechanisms in which the driving and the driven shaft have not been arranged coaxially. Thus, in the case of mechanisms in which metal rings act between adjustable cone plates, only two frictional matings can be adduced for the transmission of the output. An additional disadvantage consists in the fact that, in the case of this arrangement, an uneven stress on the thrust bearings occurs.

Furthermore, in the case of known friction mechanisms, the regulation of counter pressure necessary for a friction mechanism has not been solved in an ideal manner. Since almost all mechanisms are adjustable such that the driven (power take off) r.p.m. lies by almost the same factor either above or below the driving r.p.m., the torque of the power take off changes with the square of this factor, while the driving torque remains constant. An effective peripheral force on the drive and the power take off, however, changes only in relation to the running radii on the friction disks. Therefore, the contact pressure of the frictional matings must also change, but it is unable to do so if a contact pressure control depending on the torque is carried out on the drive or the power take off, or on both. These measures in their end effect stipulate a higher contact pressure, at least in some areas of adjustment, or produce such a high initial stress that the transmission, even while idling, will be under a stress way beyond that which is necessary. In many cases it will also be necessary that the contact pressure of the frictional matings be absorbed by the transmission housing, which necessitates, for one thing, a correspondingly strong design of the housing and which additionally makes impossible the use with an engine of a gear mechanism without a housing of its own.

In the case of known prior friction mechanisms, the area of regulation cannot be designed to a situation where the driven r.p.m. equals zero, for this can be achieved only in the case of couplings with differential gearings, for which purpose the gear mechanisms are often not suitable because the necessary connecting elements are too expensive. Many industrial applications demand large areas of regulation, reversibility of the power take off beyond the r.p.m. of zero, possibility of starting from standstill, etcetera.

It is the object of the invention to eliminate the disadvantages enumerated and to create an efficient adjustable friction mechanism which is capable of fulfilling the many and varied requirements of industry.

According to the invention, these objects can be achieved by the following measures:

By use of an arrangement having as many as possible relatively thin and long friction bodies lying in the manner of a star between two coaxial friction disks, the corresponding large number of frictional matings can transmit great output in a small space, whereby the change in the driving r.p.m. will be achieved through the fact that the axis of the friction bodies can be adjustably shifted from a parallel position in relation to the friction disks by a corresponding angle in longitudinal direction of the mechanism. As a result, a change in the running radii on the friction body and the running disk or friction disk is accomplished. The foregoing may be achieved through the fact that the friction bodies are mounted in a basket in such a way that one end of these bodies has been articulated swivelably about a fixed point of the basket, while the other end of the friction bodies can be swung through a variable point of the basket so that the variable points of the basket for the friction bodies are moved by a suitable device by the same amount in relation to the fixed point. The fixed and the variable points of the basket of the friction bodies, at the same time, are not adjustable in relation to one another in a peripheral direction. By virtue of the fact that, in every position, the friction bodies with their two shaft ends are mounted rigidly and are not able to swing in case they are articulated on one side, the contact pressure of the friction disks is absorbed by the basket of the friction bodies and the mounting of the friction bodies at the ends of the shafts. The contact pressure can be accommodated by the long lever arms since considerable forces have to be absorbed in any event by these bearings in the case of the greatest skew. Furthermore, it will be advantageous that in most cases the adjustment of the friction bodies can be accomplished from the stopped basket for the friction bodies. The design of the friction bodies and the friction disks is such that their curvatures, in case of adjustment, may roll off on top of one another. Thus, such a gear mechanism can be adjusted without damage during standstill, with no sliding friction occurring. The two friction disks and the basket for the friction bodies, with the friction bodies, are mounted on a shaft, whereby one friction disk is supported via an axial bearing by the shaft, and the other via the contact counter pressure regulation in a longitudinal direction by the shaft. For the adjustment of initial stress, a supporting point on the shaft consists of a nut. The driving disk with this driving shaft has been mounted slidably only in a longitudinal direction, while the driven disk is connected with the driven shaft in which one end of the driving shaft has been mounted.

One important advantage of this arrangement according to the invention consists in that this gear mechanism can be inserted without a special housing into every engine, since the contact pressure does not depend on a separate gear housing.

The contact counter pressure regulation necessary for the frictional matings depends, according to the invention, on the torque of the basket for the friction bodies. As this torque changes in relation to the running radii and thus of the change in the peripheral force, the contact pressure is absolutely proportional to the stress in the case of every adjustment of the friction gear mechanism and of any load occurring. Thus, an unnecessary stress of the frictional matings will be avoided and the initial stress needed for a start may be reduced to a minimum.

Another important advantage of the invention resides in the fact that the required axial bearing is used with a transmission ratio of 1:1 as an additional friction gear mechanism. Thus, it will be possible in a planetary gear mechanism connected to the outside that two r.p.m.'s of the friction gear mechanism can be combined into one driven r.p.m. so that, according to the choice of the transmission ratio of the planetary gear mechanism, the most variable regulating ranges of the entire transmission mechanism can be used in driving whereby, additionally, the performance of the frictional mechanism is increased. In the case of a drive of the basket for the friction bodies and without requiring a larger regulating area, it is possible to transmit up to four times the performance with the same friction gear mechanism. Therefore, such a friction gear mechanism with a planetary gear connected at the output side will be capable of transmitting the output of an engine of a customary motor vehicle with the required regulating range and requiring a constructional space less than that normally required. Additionally, and in accordance with the invention, such a transmission automatically becomes a clutch whenever the driven r.p.m. is equal to the driving r.p.m. and also drives the engine with the selected transmission speed in the case of downhill travel, so that the engine will act as a brake.

Other objects and advantages will become apparent from the claims, and from the description as it proceeds in connection with the drawings, in which:

FIG. 3A is an end elevation of the contact counter pressure regulator;

FIGS. 3B and 3C are side elevations of the contact counter pressure regulator illustrating actions in opposite rotational directions;

FIG. 4 is a view illustrating an alternative adjusting arrangement;

Figure 1:
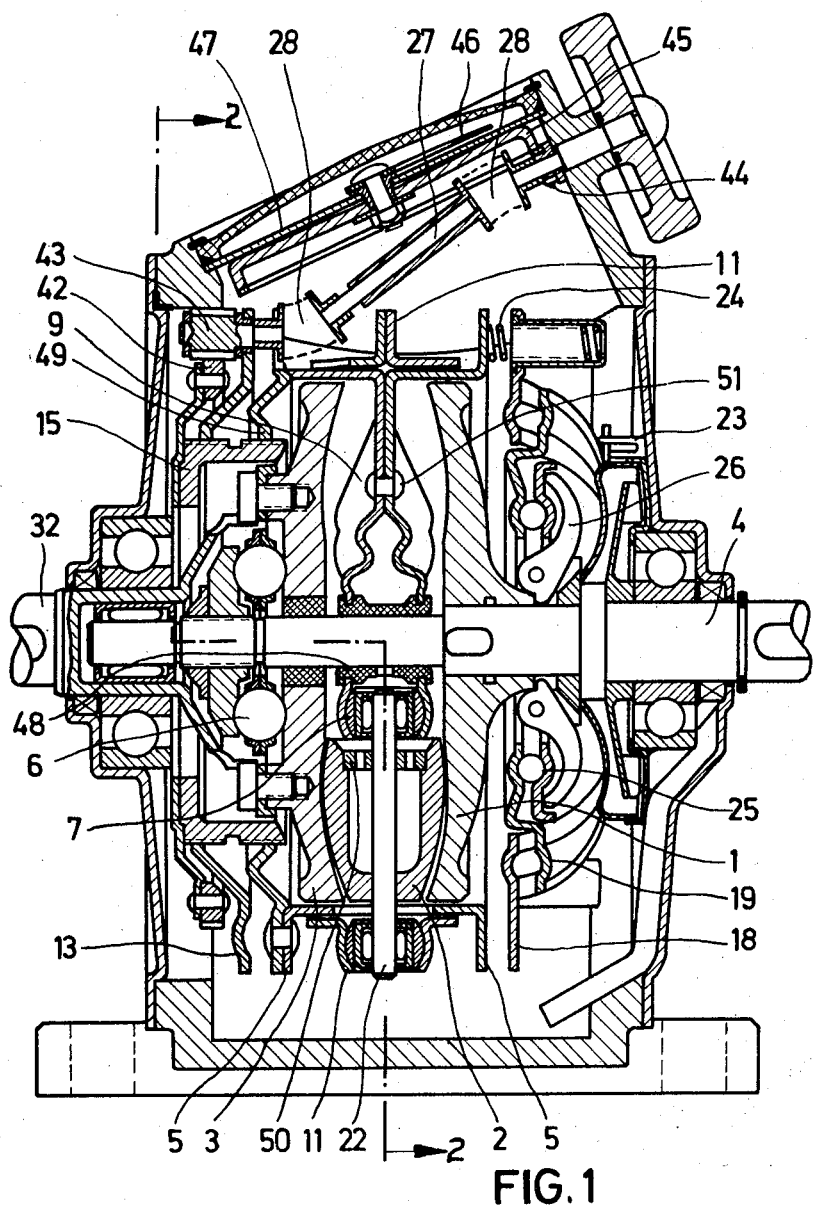
FIG. 1 is a side elevation in section showing the basic structure of a transmission embodying the friction mechanism of the present invention.

Referring now to FIG. 1, the friction disk 1 is directly driven by shaft 4, and is mounted for shiftable movement on shaft 4. Via the friction roller body 2, the power take off or driven shaft 32, which is in axial alignment with drive shaft 4, turns in a reverse rotational direction via friction disk 3. As shown, the friction roller body 2 may comprise approximately barrel-shaped rollers; however, the diameters at opposite ends advantageously differ in size, as is illustrated. In this case, the final diameter on friction body 2 lying in the direction of the center of the mechanism is larger. This is advantageous in that, when running, the power take off r.p.m. of the friction disk 3 on this diameter, which is then tangent at the smaller end diameter of the friction body 2, is smaller by the final diameter ratio that it would have to be according to the ratios of the running radii on the friction disks 1 and 3. Conversely, when the friction body 2 is driven by the friction disk 1 on its small end diameter, the power take off r.p.m. of friction disk 3 becomes greater by the amount than it would have to be according to the ratios of the running radii. Thus, the regulating range of the transmission can be enlarged advantageously without the ratio of the running radii on the friction disks, and thus of the total diameters of the transmission, becoming too large. Also, the baskets for the friction bodies 2 may be designed to be more stable as a result of this measure and in the case of a smaller diameter.

As is shown in FIG. 1, the friction rollers 2 may be hollow bodies. As a result, there is achieved a saving in weight and also improved cooling. As shown, the friction body 2 at its end of smaller diameter has a bore which receives the shaft 22, while at the other end a pressed-in disk 50 establishes the firm connection between the friction body 2 and shaft 22. This disk itself may have several through bores (not shown) on its periphery.

The friction disk 3 is mounted rotatably on shaft 4 and is supported via the axial bearing 6 in longitudinal direction by shaft 4 and an adjusting nut.

The basket 5 for the friction bodies consists of two cups connected with each other which, between them, receive the swivel bearings 7 toward the middle. At the periphery, they have as many perforations 8 (see FIG. 2) as there are barrel-shaped friction roller bodies 2 which are arranged in the shape of a star, as is evident from FIG. 2.

As shown in the upper half of FIG. 1, both cups of the basket 5 for the friction bodies, which are connected with one another (FIG. 2) at the outside periphery via rivets 10, then spread apart in the shape of a cone until they receive the swivel bearings 7, and they are connected at a distance in the middle by the friction bearing 48. Between the individual friction bodies 2, the conical course is interrupted and a further means for connection of rivet 51 is created by a bead 9. Accordingly, the basket 5 for the friction bodies may have the necessary strength with a small material thickness as a stamped part, which strength is required by the bearing pressure at the swivel bearing 7 in the case of a slanted positioning of the friction bodies 2.

The basket 5 for the friction bodies has been shown mounted on shaft 4 by way of a friction bearing 48.

Figure 6:
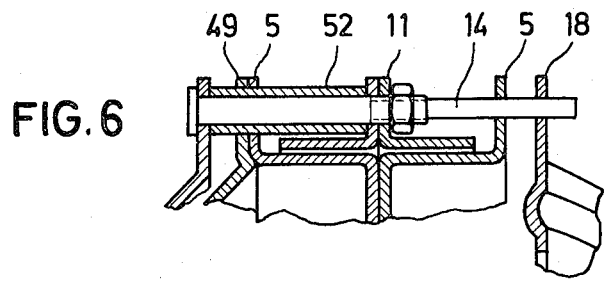
FIG. 6 is a view showing an arrangement of a shifting bolt which is not visible in FIG. 1.

The ends of shafts 22 pointed to the outside may move freely in basket 5 for the friction bodies, but they are mounted in a ring 11 which consists of two symmetrical elements and which has receiving elements for the outside swivel bearings 7. This ring 11 has been mounted firmly, for rotation, but shiftably in a longitudinal direction with basket 5 for the friction bodies via distancing bolts 14 (see also FIG. 6). Longitudinal shifting of ring 11 relative to the basket 5 for the friction bodies may be accomplished advantageously, as shown, via a threaded ring 15 and is necessary for the setting of the required slanted positioning of friction bodies 2. At the same time, this threaded ring 15 has a righthanded and lefthanded thread, one of which, connected with basket 5 for the friction bodies, acts upon the further threaded ring 49, while the other acts upon the third threaded ring 13 connected with ring 11 via the distancing bolt 14. The adjustment of the threads is introduced via gear 42 upon which pinion 43, operated manually, will act.

The regulation of contact counter pressure, which is best understood by reference to FIGS. 3A, B, and C, operates in dependence on the torque. The torque adduced for this purpose acts upon ring 18 which is shown also in FIG. 1. Ring 18 on its front side has varying slanting planes, whose pitch has been laid out in such a way that upon the start of ring 18 against the synchronized ring 19, the lateral force presses the frictional matings corresponding to the stress, whereby the lateral force is a function of the angle of friction of the frictional matings. The planes differ in their pitch and make possible the regulation of pressure in both rotational directions. A regulation of contact counter pressure with as little as possible loss is to be achieved by a mutual start of the two rings 18 and 19 via the spherical roller bodies 20. These spherical roller bodies 20 are carried in a cage 21 which adapts itself to the shape of the slanting planes across its periphery. Since, in the case of regulation, only half of the slanting planes are in contact with one another and the other half of the slanting planes move away from one another, the roller bodies 20, which become completely free, must be held in cage 21.

The overall arrangement of the pressure regulating arrangement is best understood by reference to FIG. 1. The pressure regulating arrangement depends in its effect on the adjustment of the transmission of the gear mechanism. In the case of swiveling of the friction rollers 2, the latter unroll with their radius of curvature $r_1$ on the curvature of the friction disk 1 and with the curvature radius $r_2$ on friction disk 3. At the same time, the friction disks 1 and 3 approach each other, in the case of a center position, that is to say, whenever the axes of the friction bodies 2 are in parallel with the friction disks. In the case of any other setting of the transmission ratio, the space between the friction disks increases until the friction bodies 2 run with their ends on the friction disks 1 and 3. The difference in the spacing of the friction disks, however, will not influence the arrangement for regulating the pressure.

Pressure regulation is accomplished by the following two measures: First of all, the length of the slanting planes on the rings 18 and 19 is dimensioned such that, in the case of spreading, the difference in the distance of the friction disks will be run through whenever the transmission ratio is regulated in the middle position. Only then will the actual pressure regulation begin. Secondly, during this idling of the pressure regulating arrangement, an initial stress adjusted by springs 24 will act. The springs 24 must be arranged in such a way that the force of the spring will be changed only slightly over this path. However, the further the friction disks 1 and 3 move away from one another in the case of a change of the transmission ratio, the less the force no load speed will develop on the rings 18 and 19. The total pressure regulating process will now be explained in accordance with FIG. 1.

Assuming the rotation of friction disk 1 by drive shaft 4, a torque develops on basket 5 for the friction bodies. This torque changes over the entire adjusting area of the transmission at a ratio of the change of the running radii on friction disk 1. The peripheral force which acts each time on the friction disk 1 corresponds to the same ratio. The latter stipulates a pressure force on the frictional matings corresponding to the frictional angle. In order to allow the torque to become effective on basket 5 for the friction bodies 2, the latter have been mounted freely movably in a peripheral direction on shaft 4. Ring 18 is connected with basket 5 for the friction bodies via the distancing bolt 14. As explained previously in connection with FIGS. 3A—C, ring 18 runs against ring 19. The latter is connected with the transmission housing via the shifting arrangement 23, or is supported by some solid point. In the case of subsequent spreading of rings 18 and 19, ring 18 will be able to compress springs 24 for the initial stress, the more so whenever the transmission ratio of the transmission lies in the middle of the adjusting range.

Only when springs 24 have passed through their path will ring 19 be forced in the opposite direction. Axial bearing 25 follows this path and also levers 26 distributed on the periphery. The pivotal point of a lever 26 lies on shaft 4, the shorter lever arm acting upon friction disk 1, and thus produces the necessary pressure for the frictional matings. The entire arrangement is advantageous in that the necessary counter pressure of the friction matings corresponds to a constant frictional angle or factor across the entire range of transmission adjustment and in the case of any stress. Thus, in the case of the correct choice of the frictional factor, it will be possible to prevent this mechanism from slipping whenever the stress suddenly changes, whereby the regulating installation for the counter pressure takes over by itself, because of its elastic effect, the roll of a rotatably elastic coupling.

A further important advantage consists in that, because of the reduction of the force of the counter pressure at levers 26, the actual counter pressure the regulating installation will have to absorb is only a fraction of the required force of counter pressure, and subsequently can be designed lighter and produced more cheaply because it will be possible to use stamped parts. Additionally, the axial mounting must absorb only this fraction of the force and thus runs with less loss. The same is true for the roller bodies 20. Their raceways on rings 18 and 19 do not need to be case hardened, and they may be provided by superpositioning a strip of spring steel over the periphery of rings 18 and 19 at their slanting planes.

Since basket 5 for the friction bodies changes its peripheral position in correspondence to the stress, the introduction of the adjustment of the transmission according to FIG. 1 must be accomplished via a knockout spindle 27 in connection with two universal joints 28.

Figure 2:
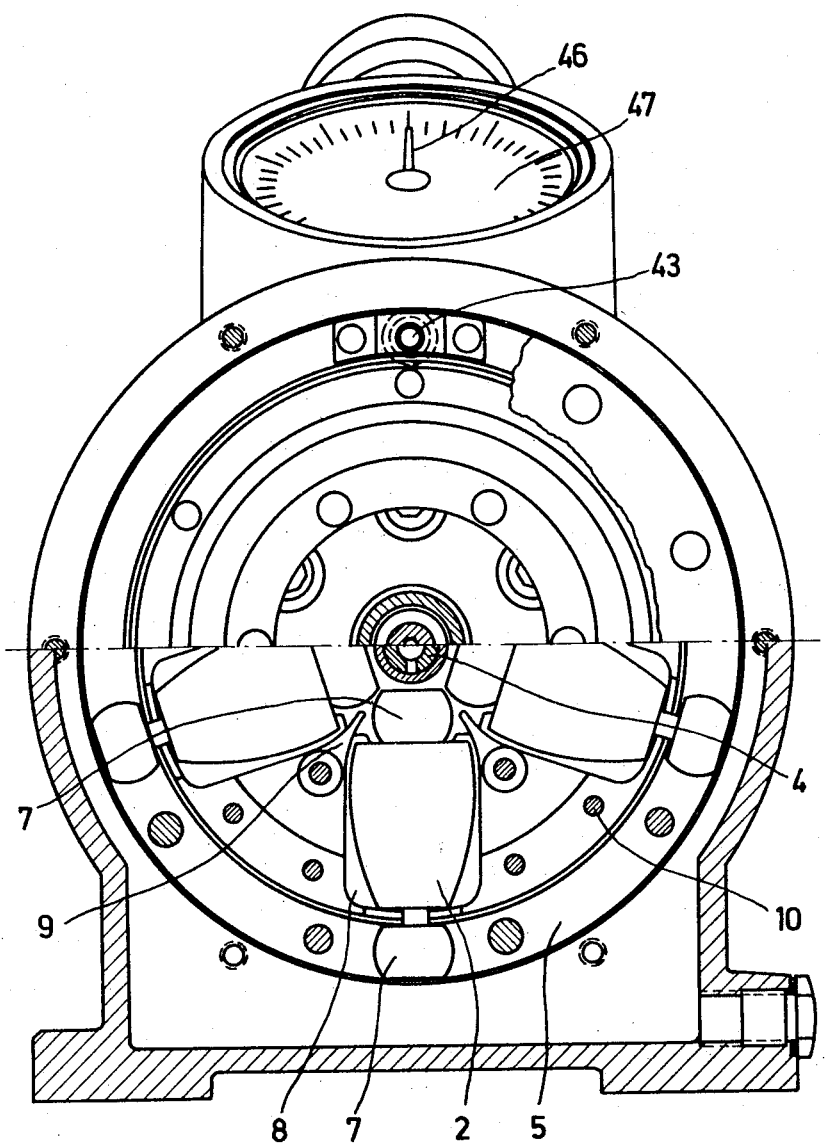
FIG. 2 is an end elevation in partial section showing the basic structure of the mechanism taken along lines 2—2 of FIG. 1.

A very advantageous solution of this arrangement has been shown in FIGS. 1 and 2. The drive shaft 27, pointed in the longitudinal direction of the gear mechanism slantingly upward, is capable of absorbing without any larger change in lengths the oscillation or pendulation of basket 5 for the friction bodies. At the same time, an indicator 46 is driven across a scale 47 by means of gear 45 via pinion 44, so that a clear indication of the pertinent adjustment of the gear mechanism and of the driven r.p.m. will be visible. Thus, it will also be possible during standstill to set a driven r.p.m. desired for operation.

FIG. 4 shows a modification of the adjustment. In the case of a properly steep pitch of the threaded rings 13, 15, 49, a slight turn of the threaded ring 15 will be sufficient which, with reference to the threaded ring 13, can be forced by a threaded spindle 17 with a righthand and lefthand thread. The manual drive must again take place via a drive shaft which in this case must be operated laterally in relation to the gear mechanism.

Figure 5:
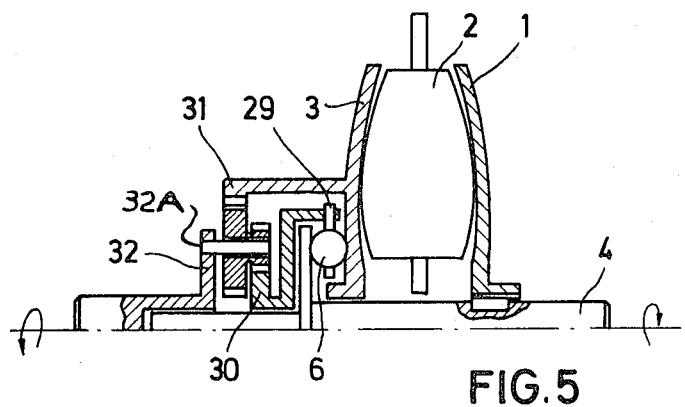
FIG. 5 is a view showing a planetary gearing arrangement connected between the friction mechanism and the driven shaft.

Referring now to FIG. 5, the driving shaft 4 imparts rotation to friction disk 1. Friction disk 3 is driven by friction roller bodies 2, as discussed above. Friction disk 3 is prevented from longitudinal shifting by axial thrust bearing 6 which has a cage 29 that is connected to the inside of sun wheel 30. Shaft 32A is journaled in a part 32 which is shown as an extension on the driven shaft. Wheels on shaft 32A engaging sun wheel 30 and outside wheel 31 which is connected to driven friction disk 3, control the rotation of the driven shaft.

FIG. 5 shows an embodiment for enlargement of the gear mechanism described hitherto. In this embodiment, a force is taken off through apparatus including the cage of an axial bearing 6. Thus, an additional gear mechanism of the friction wheel develops with a constant transmission 1:1. The r.p.m. of cage 29 likewise changes in dependence on the transmission ratio of the friction mechanism. If the regulating range of the friction gear is designated by $R_1$, then the regulating range of the additional friction mechanism is $$R_z = \sqrt{R_1}$$

In a planetary gear mechanism connected at the outlet side, as illustrated in FIG. 5, cage 29 may be connected with the sun wheel 30 of the planetary gear, while friction disk 3 is connected with the outside wheel 31 of the planetary gear. The power take off for the driven shaft of the combination friction and gear mechanism is through bridge 32. The driving shaft 4 and other parts are similar to those shown in FIG. 1. Depending on the transmission ratio of the planetary gear, the most varied total regulating ranges can be run through. This arrangement is particularly desirable where rotation is preponderantly in one direction in a range of 0 to 2.

Figure 7:
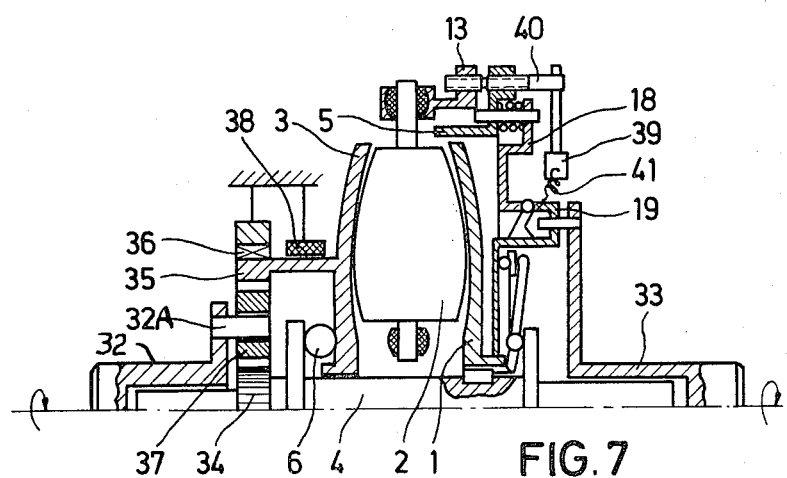
FIG. 7 is a side elevation showing the friction mechanism of the present invention with a planetary gearing arrangement as a transmission for a motor vehicle.

FIG. 7 illustrates an application of a combination friction mechanism and gearing arrangement for use as a transmission in a motor vehicle. In the case of this arrangement, the drive is accomplished via an input of driving shaft 33, counter pressure regulation arrangement, and the basket for the friction bodies. Thus, a distribution of stress along the friction rollers 2 is accomplished and four-fold performance can be transmitted through the friction mechanism described up to this point. This driving possibility requires a substantially constant counter pressure of the frictional matings over the regulating range. Therefore, the counter pressure is regulated substantially in dependence on the uniform driving torque.

Referring to FIG. 7, the driving shaft 4 imparts rotational movement to disk 1, and mates with axial bearing 6, as in the embodiment of FIG. 5. In this embodiment, sun wheel 34 turns with driving shaft 4. Planetary gear 37, which engages with sun wheel 34, is mounted on shaft 32A which is on an extension 32 of the driven shaft. Planetary gear 37 also engages outside wheel 35 which is attached to turn with driven friction disk 3.

The arrangement of the counter pressure regulating device, however, in principle changes only to the point where ring 19 is driven and strikes against ring 18. The performances of the two friction disks 1 and 3 are combined in a planetary gear connected at the outlet side. Friction disk 1 is connected to rotate with sun wheel 34, and friction disk 3 is connected to rotate with outside wheel 35. The lowest power take off r.p.m. can be achieved whenever the friction rollers 2 act on the larger roller path radius ($r_1$) of the friction disk 1 and on the smallest path radius ($r_3$) of the friction disk 3. Friction disk 1 with the large torque leads. Friction disk 3 and outside wheel 35 are supported by the free wheeling 36. With the change of the transmission ratio of the friction mechanism, the power take off r.p.m. on bridge 32 of the planetary gear is increased, the torque on friction disk 1 drops and that on friction disk 3 increases. If the transmission ratio of the planetary gear equals the smallest transmission ratio of the friction mechanism, the power take off r.p.m. of the entire transmission can become equal to the driving r.p.m. In that stage, a power equilibrium prevails in the entire gear mechanism, the gear mechanism becoming a coupling. The transmission ratio of the friction mechanism can be calculated from the pertinent radii of the roller path $$i = r_1/r_3$$

Motor vehicle transmissions, as a rule, require in the change speed gears a smallest $i$ of 0.25 to 0.28. This transmission ratio in the case of a constant performance may pass over infinitely variably into the transmission ratio $i = 1$ with the transmission described, whereby the degree of effectiveness lies considerably above that of known automatic transmissions, particularly in the starting range. The internal losses of the transmission will cause the free wheeling 36 to release outside wheel 35 prior to its reaching the transmission $i = 1$ and thus the r.p.m. of friction disk 1 drops. Should any doubt exist that the r.p.m. of friction disk 1, as compared to $i = 1$ becomes too high, then measures can be taken to couple friction disk 3 and thus outside wheel 35 against the sun wheel 34 prior to its reaching $i = 1$. That can have already been achieved, for example, through the fact that the planetary gear operates as a geared pump, whereby pressure will be transmitted from the mating sun wheel 34/planetary gear 37 to the mating planetary gear 37/outside wheel 35. The compression valve can be operated by centrifugal force within the desired range of r.p.m. The losses occuring are relatively slight since the last range would then be run through very quickly.

It is another advantage of this invention that in the case of downhill travel and by arresting the outside wheel 35 by a brake 38, a drive of the engine takes place, whereby a transmission ratio used previously will be fixed simultaneously for the duration of the downhill travel.

The adjustment of the regulating range of the gear mechanism in this case may be accomplished in dependence on the driving r.p.m. advantageously through centrifugal force. Several centrifugal weights 39 act through lever rods which cause rotation of the adjusting screws 40. Screws 40 have righthand and lefthand threads and effect a shift or basket 5 for the friction bodies in relation to ring 13. In the starting position, springs 41 hold the centrifugal weights 39 in their desired proper position. A precise synchronization of the ratios can be achieved through the fact that the effective length of the lever rods on the centrifugal weight 39 may be made changeable in a conventional manner.

An influencing of the arrangement for the adjustment of transmission depending on the stress can be achieved additionally through the fact that the return springs 41 are influenced by the regulation of the counter pressure as illustrated in FIG. 7. Through a more marked lag of basket 5 for the friction bodies in relation to the drive 33, the springs are tightened more intensely. The position of the centrifugal weights 39 may be arrested, if desired, in a conventional manner (not shown), so that a firm, predetermined transmission ratio that has been selected can then be used whenever driving conditions make it necessary.

The transmission as just described offers many advantages as compared to known automatic automobile transmissions, such as a high degree of effectiveness, infinite regulation, braking effect in combination with the driving engine in the case of downhill travel, cheapness in production, an enormous saving of space and less likelihood to need repair.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. Apparatus for varying the rotational velocity of an output shaft driven by a rotating input shaft comprising an infinitely variable friction mechanism including a pair of friction disks each mounted for rotation about the axis of the input shaft, said friction disks having spaced facing surfaces with an input disk coupled to rotate with the input shaft and an output disk coupled to rotate with said output shaft, a plurality of barrel-shaped friction roller bodies that are each mounted for rotation about a shaft and have surfaces which frictionally engage the facing surfaces of said friction disks; a basket for positioning the shafts of said barrel-shaped friction roller bodies; means for varying the transmission ratio of said friction mechanism including means for articulating said barrel-shaped friction roller bodies including a first ring mounted for shiftable movement only in a longitudinal direction parallel to said input shaft axis; and means for producing a continuous counter pressure between said friction disks to maintain the requisite frictional matings with said barrel-shaped friction roller bodies.

2. Apparatus according to claim 1 wherein the shiftable mounting means for said ring includes swivel bearings (7), and characterized in that the basket for the barrel-shaped friction roller bodies consists of two stamped symmetrical cups each having a flat side with openings (8) corresponding to the locations of said roller bodies and corresponding recesses (11) for receiving the outer ends of the shafts for said roller bodies.

3. Apparatus according to claim 1 characterized in that the basket for the barrel-shaped friction roller bodies and said first ring have at their peripheries oppositely threaded members, and said articulating means comprises a second ring (15) with correspondingly threaded portions for shifting said basket and said first ring in said longitudinal direction in relation to one another; and means including a bolt (14) for preventing a twisting of said basket and said first ring in relation to one another.

4. Apparatus according to claim 1 characterized in that the barrel-shaped friction roller bodies (2) have diameters of different sizes at the ends of their friction surface.

5. Apparatus according to claim 1, wherein said output friction disk is supported on said input shaft against longitudinal adjustment by means including an axial bearing and an adjusting nut, and said input friction disk is mounted for shiftable movement in a longitudinal direction along said input shaft by said counter pressure producing means.

6. Apparatus according to claim 1 characterized in that the torque prevailing on basket (5) for the friction bodies is used for the counter pressure regulation of the frictional matings.

7. Apparatus according to claim 6 characterized in that the counter pressure producing means consists of third and fourth rings (18) and (19) which have alternating slanting planes on the periphery of their front surfaces.

8. Apparatus according to claim 7 characterized in that said third ring (18) is connected shiftably and flexibly with said basket while said fourth ring (19) is mounted for shiftable movement in relation to a fixed point.

9. Apparatus according to claim 8 characterized in that the force produced by said counter pressure means is transferred to the input friction disk by means including said fourth ring (19), an axial bearing (25) and lever means (26), while the pivotal point of said lever means (26) lies on said input shaft.

10. Apparatus according to claim 7 wherein said counter pressure producing means comprises roller bodies (20) which are guided in a cage located between said third and fourth rings (18) and (19), said cage having a shape corresponding to slanting planes in facing surfaces of said third and fourth rings (18) and (19).

11. Apparatus according to claim 10 characterized in that the running path of the roller bodies (20) is formed by a case hardened, spring steel sheet placed onto the rings (18) and (19).

12. Apparatus according to claim 5 further having means to produce an additional driving force from the cage of the axial bearing (6) against which said output friction disk is supported.

13. Apparatus according to claim 12 further having a differential transmission (30, 31, 32) connected between said output friction disk and the output shaft wherein the torques and the r.p.m.'s of the output friction disk and the cage of the axial bearing (6) have been combined.

14. Apparatus according to claim 12 further having a planetary gear arrangement including an inside sun wheel (30) which is rigidly connected to the cage of said axial bearing.

15. Apparatus according to claim 1 further having a differential transmission including an inside sun wheel (34) mounted on the input shaft to rotate concomitantly with said input friction disk, and an outside wheel (35) mounted to rotate concomitantly with said output friction disk, and wherein the transmission ratio is equal to the smallest transmission ratio of said friction mechanism (FIG. 7).

16. Apparatus according to claim 15 characterized in that the outside wheel (35) is supported by a free wheeling (36) counter to the power take off rotational direction.

17. Apparatus according to claim 15 further including a brake (38) for restraining the outside wheel (35) against rotation.

18. Apparatus according to claim 15 characterized in that said fourth ring (19) of the counter pressure producing means is connected for rotation with said input shaft and for shiftable movement along the axis thereof.

19. Apparatus according to claim 1 wherein said transmission ratio varying means comprises speed responsive means, including centrifugal weights (39) which are displaceable for adjusting the position of the basket and first ring in relation to one another.

20. Apparatus according to claim 19 wherein said centrifugal weights act on levers whose effective length across a swiveling range is variable.

21. Apparatus according to claim 20 wherein said centrifugal weights (39) are connected with the input shaft via return springs (41).

22. Apparatus according to claim 1 characterized in that the barrel-shaped friction roller bodies comprise hollow bodies pressed about their respective shafts.

23. Apparatus according to claim 2 characterized in that the cups of the basket have an area expanding in the shape of a cone in the receiving range of barrel-shaped friction roller bodies in the direction of the input shaft.

24. Apparatus according to claim 2 characterized in that the cups of said basket are connected with one another and located at a distance from one another by means including a friction bearing (48) arranged on said input shaft.

25. Apparatus according to claim 1 wherein the transmission ratio varying means includes a hand-manipulatable drive shaft (27, 28) pointed at an acute angle relative to the longitudinal axis of said input shaft, an indicating device, and means for setting said indicating device in response to the adjustment of the transmission and for displaying the number of revolutions of the output shaft.

* * * * *